United States Patent

[11] 3,599,018

[72] Inventors Isamu Washizuka
Osaka;
Satoshi Teramura, Nara-shi; Hitoshi Hanahara, Yamatokoriyama-shi, all of, Japan

[21] Appl. No. 791,367
[22] Filed Jan. 15, 1969
[45] Patented Aug. 10, 1971
[73] Assignee Sharp Kabushiki Kaisha
Osaka, Japan
[32] Priority Jan. 25, 1968
[33] Japan
[31] 43/4661

[54] FET FLIP-FLOP CIRCUIT WITH DIODE FEEDBACK PATH
2 Claims, 12 Drawing Figs.

[52] U.S. Cl. .......... 307/279, 307/247, 307/251
[51] Int. Cl. .......... H03k 3/286
[50] Field of Search .......... 307/205, 251, 279, 304, 221, 292, 247

[56] References Cited

UNITED STATES PATENTS

| | | | |
|---|---|---|---|
| 3,252,009 | 5/1966 | Weimer | 307/251 X |
| 3,406,346 | 10/1968 | Wanlass | 307/221 X |
| 3,431,433 | 3/1969 | Ball et al. | 307/221 |
| 3,483,400 | 12/1969 | Washizuka et al. | 307/279 |
| 3,134,030 | 5/1964 | Dao | 307/292 X |
| 3,402,305 | 9/1968 | Gilligan | 307/292 |
| 3,437,844 | 4/1969 | Chua | 307/292 |

*Primary Examiner*—John S. Heyman
*Attorney*—Eugene E. Geoffrey, Jr.

ABSTRACT: A flip-flop circuit particularly useful in connection with integrated circuitry and embodying a feedback path which functions to stabilize the output when both set and reset input signals are applied to the input of the circuit.

INVENTORS
ISAMU WASHIZUKA
SATOSHI TERAMURA
HITOSHI HANAHARA
BY
ATTORNEY

INVENTORS
ISAMU WASHIZUKA
SATOSHI TERAMURA
HITOSHI HANAHARA
BY
ATTORNEY

INVENTORS
ISAMU WASHIZUKA
SATOSHI TERAMURA
HITOSHI HANAHARA
BY
ATTORNEY

INVENTORS
ISAMU WASHIZUKA
SATOSHI TERAMURA
HITOSHI HANAHARA

BY

ATTORNEY

FET FLIP-FLOP CIRCUIT WITH DIODE FEEDBACK PATH

This invention relates to a novel and improved flip-flop circuit embodying means for stabilizing the output when two signals are applied to the input. By reason of a novel and improved arrangement of elements, the invention is particularly suited for utilization with integrated circuitry.

Recent developments in electronic circuits involve integrated circuitry which is particularly useful in connection with electronic computers. In many cases flip-flop circuits are used for storage and judging purposes in electronic computers, but known circuits have not been found entirely satisfactory because of their size and the difficulties entailed when integration techniques are utilized. Difficulty is also entailed with known circuitry in cases where an additional function is to be added since the effectiveness of integration, namely, the number of flip-flops per integrated circuit, would be considerably reduced.

This invention overcomes the difficulties heretofore entailed with flip-flop circuitry and provides a novel and improved circuit configuration particularly suited for integration and utilizes as a part thereof the D-type flip-flop which has been found most suitable for use in connection with integrated circuitry.

Flip-flop circuits generally known as the RS type have two input terminals and one output terminal though some of the circuits include a second output terminal for deriving a "not" signal. The following table represents the input and output states of such circuitry:

| $R^n$ | $S^n$ | $Q^{n+1}$ |
|---|---|---|
| 0 | 0 | $Q^n$ |
| 0 | 1 | 1 |
| 1 | 0 | 0 |
| 1 | 1 | ? |

In the above table $R^n$ and $S^n$ are indicative of the states of the reset input and the set input at bit time $n$, and $Q^n$ and $Q^{n+1}$ are indicative of the output states at bit times $n$ and $n+1$. It will be observed that the operation of the circuit is unstable when both the set and reset inputs are "1" and thus the circuit cannot be utilized unless one or both of the input signals is "0."

With this invention a flip-flop circuit is provided having means for introducing first and second input signals, storage means which can assume two different states in response to the presence or absence of input signals, feedback means between the output and the input of the storage means, switching means for controlling the feedback path, and means for introducing one input to the storage means and a second input to the switching means in the feedback path. With this arrangement, the output state is always stabilized at "1" when both set and reset input signals exist as the circuit is provided with control means for driving the flip-flop into its set state by giving preference to the set input. With this improved circuit arrangement operation according to the following table is obtained:

| $R^n$ | $S^n$ | $Q^{n+1}$ |
|---|---|---|
| 0 | 0 | $Q^n$ |
| 0 | 1 | 1 |
| 1 | 0 | 0 |
| 1 | 1 | 1 |

Another object of the invention resides in the provision of a novel and improved flip-flop circuit with switching means at the set input and means for controlling the switching means with the output of the flip-flop. While this improved circuit performs an operation equivalent to the flip-flop known as the JK type, it employs a novel simplified structure and is particularly suitable for application to integrated circuits.

While in the following description of the several embodiments of the invention the structural elements such as storage elements, switching elements, resistor elements and the like are assumed to be MOS field effect transistors, which may be readily utilized in integrated circuitry, it is to be understood that the invention is not specifically limited to such transistors but that any equivalent elements can be utilized as may be desired. For example known mechanical and electronic switches may be utilized as the switching elements.

The above and other objects and advantages of the invention will become more apparent from the following description and accompanying drawings forming part of this application.

In the drawings.

To facilitate an understanding of the invention, identical reference numerals have been used to identify corresponding circuit components in each of the figures.

Figure 1:
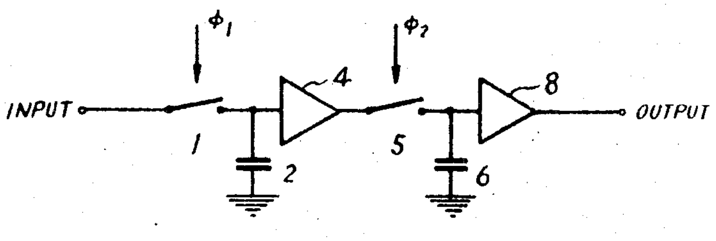
Fig. 1 (PRIOR ART)
FIG. 1 is a circuit diagram showing the principle of operation of a known D-type flip-flop circuit.

FIG. 1 is a theoretical circuit diagram of a conventional D-type flip-flop. This circuit includes a switch 1, an inverter 4, a switch 5, and an inverter 8 connected in series between the input and output terminals. Capacitors 2 and 6 are connected respectively to the junction of switch 1 and inverter 4 and the junction of switch 5 and inverter 8. The other sides of the capacitors 2 and 6 are connected to ground which represents a reference potential point. The switches 1 and 5 are controlled by clock pulses $\phi_1$ and $\phi_2$. For the purposes of this description, it is assumed that all of the switches are driven into an ON state by a low level control signal and into an OFF state by a high level control signal. It is further assumed that all storage elements operate in accordance with a positive logic system, that is, they store a binary "0" when they are at a low level and store a binary "1" when they are at a high level.

Figure 2:
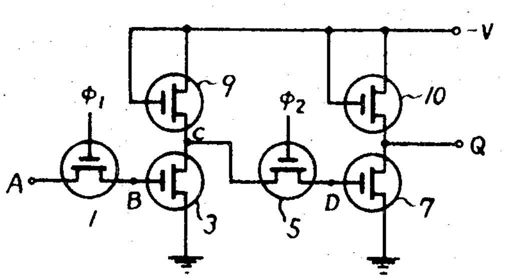
Fig. 2 (PRIOR ART)
FIG. 2 is a circuit diagram of the D-type flip-flop circuit of FIG. 1 utilizing field effect transistors.

FIG. 2 illustrates the D-type flip-flop of FIG. 1 utilizing MOS field effect transistors which are particularly adaptable for use in integrated circuitry. With this arrangement the field effect transistors or switches 1 and 5 are operated by clock pulses $\phi_1$ and $\phi_2$ which are applied to the gate electrodes. Similar field effect transistors 3 and 7 correspond to the inverters 4 and 8 of FIG. 1. The gate electrodes of transistors 3 and 7 are connected respectively to the output terminals of the switches or transistors 1 and 5. The source electrodes of transistors 3 and 7 are grounded and the capacitors 2 and 6 of FIG. 1 are the gate-ground interelectrode capacitances of the transistors 3 and 7. Field effect transistors 9 and 10 serve as load resistors for the transistors 3 and 7 and the drain electrodes of transistors 3 and 7 are connected through the transistors 9 and 10 to a negative voltage source −V.

Figure 3:
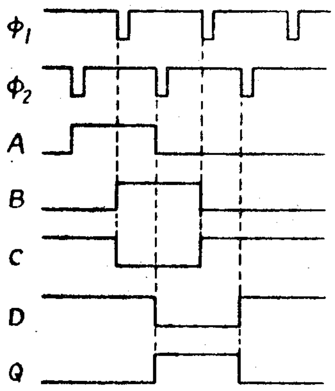
FIG. 3 is a graph illustrating the operation of the circuit shown in FIG. 2.

In the operation of the device described in connection with FIG. 2, let it be assumed that an information signal is applied to the input terminal A. When a clock pulse $\phi_1$ is applied to the gate electrode of transistor 1, the transistor is driven into conduction and the potential at the point A is transferred to the point B. Upon termination of the clock pulses $\phi_1$ transistor 1 becomes nonconductive and an electric charge corresponding to the potential at point B is temporarily stored in the gate-ground interelectrode capacitance of transistor 3. The potential at point B is then inverted by transistor 3 and appears at point C which is connected to the drain terminal of that transistor. If a clock pulse $\phi_2$ is then applied to the gate electrode of transistor 5, that transistor becomes conductive and the potential at point C is transferred to point D. Upon interruption of the clock pulse $\phi_2$, the transistor 5 becomes nonconductive and an electric charge corresponding to the potential at point D is stored in the gate-ground interelectrode capacitance of the transistor 7. The potential at point D is then inverted through the transistor 7 and appears at the output terminal Q. FIG. 3 is a graph showing the correlation of the potential variations in the circuit of FIG. 2 and the clock pulses $\phi_1$ and $\phi_2$. As is evident from the foregoing, the input information is transferred to the output terminal Q with a delay of one bit time which corresponds to the time between the clock pulses. Accordingly, if the input state at bit time $n$ is $D^n$ and the output state at bit time $n+1$ is $Q^{n+1}$, then the operation can be represented by the following table:

| $D^n$ | $Q^{n+1}$ |
|---|---|
| 0 | 0 |
| 1 | 1 |

Figure 4:
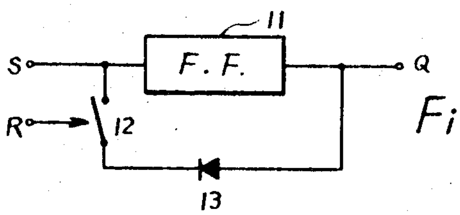
FIG. 4 is a circuit diagram illustrating the operation of the novel and improved flip-flop circuit in accordance with the invention.
Figure 5:
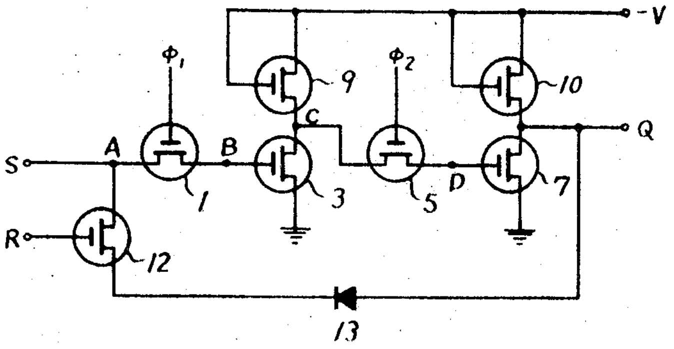
FIG. 5 is a circuit diagram of the embodiment of the invention illustrated in FIG. 4 utilizing field effect transistors.

Reference is now made to FIG. 4 which represents a theoretical circuit diagram of a flip-flop in accordance with the invention. The block 11 is D-type flip-flop as described in connection with FIGS. 1 and 2. A feedback circuit comprising a switch 12 and rectifier 13 in series is connected between the input terminal S and the output terminal Q. The switch 12 is controlled by the reset terminal R while the input to the flip-flop 11 is obtained from the set input terminal S. The rectifier 13 is polarized so that only a high potential at the output terminal Q is fed back to the input terminal. FIG. 5 illustrates a practical application of the circuit of FIG. 4 utilizing a MOS field effect transistor as the switch 12. With the circuit as shown in FIG. 5, let it be assumed that the set input is "1" and the reset input is "0" under the condition that zero voltage corresponds to the binary "1" and a negative voltage corresponds to the binary "0" which is in accordance with the conditions heretofore described. The set input "1" is fed to the output terminal Q in accordance with the operation of the D-type flip-flop as previously described, and the output terminal Q is therefore raised to the "1" state at the next bit time. Even though the transistor 12 is in a conductive state by reason of the application of the reset input "0" to the terminal R, the set input will not be transmitted through the feedback circuit to the output terminal nor will the input be effected by the potential of the output terminal which is at a negative potential at this time. Therefore, the set input "1" is transferred to the output terminal with the delay of one bit time.

In the case where the set input is "0" and the reset input is also "0," transistor 12 remains in a conductive state and the set input terminal is at a negative potential. Under these conditions if the potential at the output terminal Q is 0 volts and this potential is fed back through the diode 13 to the input to raise the input terminal to 0 volts, that is, the "1" state. However, if the potential at Q is −V volts, then the set input terminal will remain at the negative potential. Thus an output state preceded by one bit appears at the output at the next bit time.

In the case where the input is "0" and the reset input is "1," the transistor 12 becomes nonconductive and the feedback circuit is opened. In this instance the flip-flop performs the operation of a conventional D-type flip-flop, and therefore, the set input "0" is transferred to the output and at the next bit time exhibits the "0" state. In the case where both the set and reset inputs are "1," the transistor 12 is nonconductive and again the feedback path is open. Since the reset input only functions to make the transistor 12 nonconductive, the set input is transferred in preference to the reset input to the output put to raise the output terminal to the "1" state at the next bit time.

Figure 6:
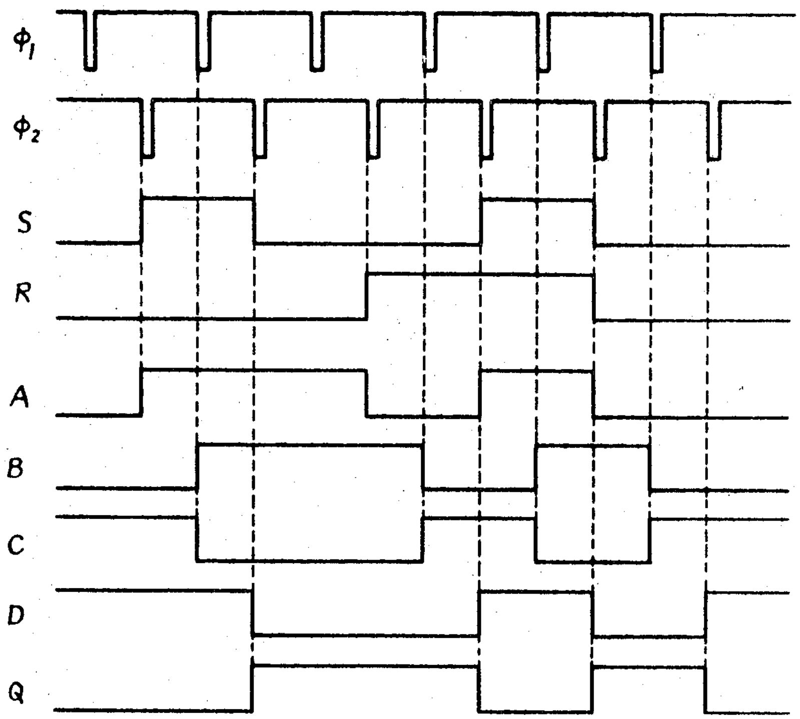
FIG. 6 is a graph illustrating the operation of the embodiment of the invention shown in FIG. 5.

The operation as described above is shown in graphical form in FIG. 6 wherein at the potential variations at the various points in the circuit of FIG. 5 are illustrated. Operation of the circuit will occur in accordance with the following table:

| $R^n$ | $S^n$ | $Q^{n+1}$ |
|---|---|---|
| 0 | 0 | $Q^n$ |
| 0 | 1 | 1 |
| 1 | 0 | 0 |
| 1 | 1 | 1 |

From the foregoing it is apparent that unstable operation of the conventional RS type flip-flop at the time both the set and reset inputs are "1" is eliminated and the set input at the time when the reset input is "1" is given preference.

Figure 7:
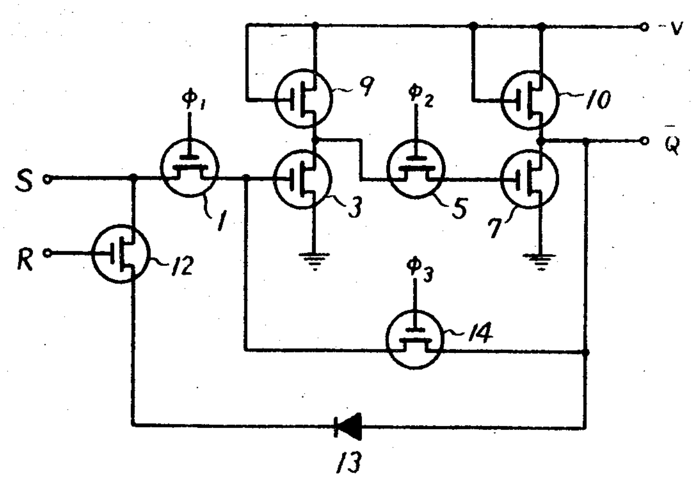
FIG. 7 is a circuit diagram of a modified embodiment of a flip-flop circuit in accordance with the invention.

FIG. 7 is a modification of the circuit of FIG. 5. A field effect transistor 14 is used for stabilizing the operation of the circuit by providing a feedback path in response to a third clock pulse $O_3$ in order to prevent feedback when the switching transistor 5 is driven into conduction by the clock pulse $O_2$ for the transmission of information from the transistor 3 to the transistor 7. Through the utilization of the transistor 14, the circuit can be also utilized in a static mode. The D-type flip-flop shown in FIG. 7 but excluding the transistor 12 and the diode 13 forms the subject matter of a copending U.S. Pat. No. 3,483,400 granted Dec. 9, 1969.

Figure 8:
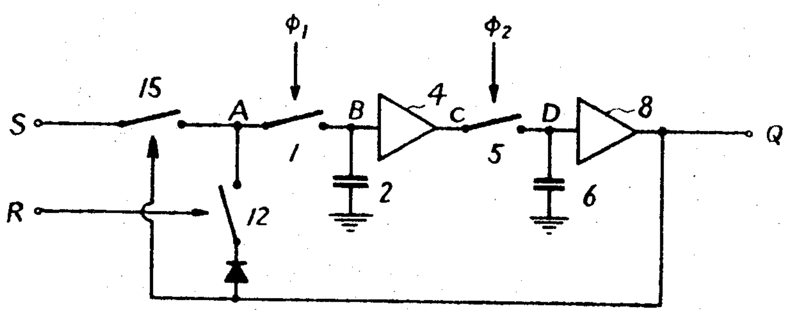
FIG. 8 is a circuit diagram showing the principle of operation of still another embodiment of the invention.

FIG. 8 is a theoretical diagram of still another embodiment of the invention and performs a function similar in certain respects to the JK type flip-flop. In this figure a switch 15 is inserted in series with the set terminal S and is controlled directly by the potential at the output terminal Q. With this circuit let it be assumed that the set and reset inputs are "0." The switch 12 is closed by the reset input "0" and a high potential at the output terminal Q is fed back to the point A. At the same time the output potential is fed back as a control input for the switch 15 and closes the switch 15 when the output is "0." However, since the set input is "0," the potential at A is not affected. When the output is "1," the switch 15 is opened, the set "1" is fed back through the closed switch 12 to the point A and thus the original storage state is preserved, that is, the output state at the next bit time corresponds to the output state at the preceding bit time.

In the case where the set input is "1" and the reset input is "0," the switch 12 is closed. If the output is "0," the switch 15 is closed and the set input "1" is fed to the point A. In the case where the output is "1," the switch 15 would be open but the output "1" would be fed back through the switch 12 to point A causing point A to assume the "1" state. Therefore, the output state at the next bit time would always be "1."

Assuming now a condition wherein the set input is "0" and the reset input is "1." In this instance the switch 12 is open. If the output is "0," the switch is closed and will permit the set input to be transmitted to a point A causing it to assume the "0" state. Should the output be "1," then both switches 12 and 15 are open and the state "1" is not transmitted to point A. Accordingly, the output state at the next bit time would be "0."

Assuming now the condition wherein both the set and reset inputs are "1," in which case switch 12 would be open as in the previous instance. If the output state is "0," the switch 15 is closed and the set input is fed to the point A causing it to assume the "1" state. If the output state is "1," the switch 15 would be open and the state "1" would not be fed to point A. Thus the state of point A is the "not" state of the output and is $\overline{Q}$ if the output is Q.

Figure 9:
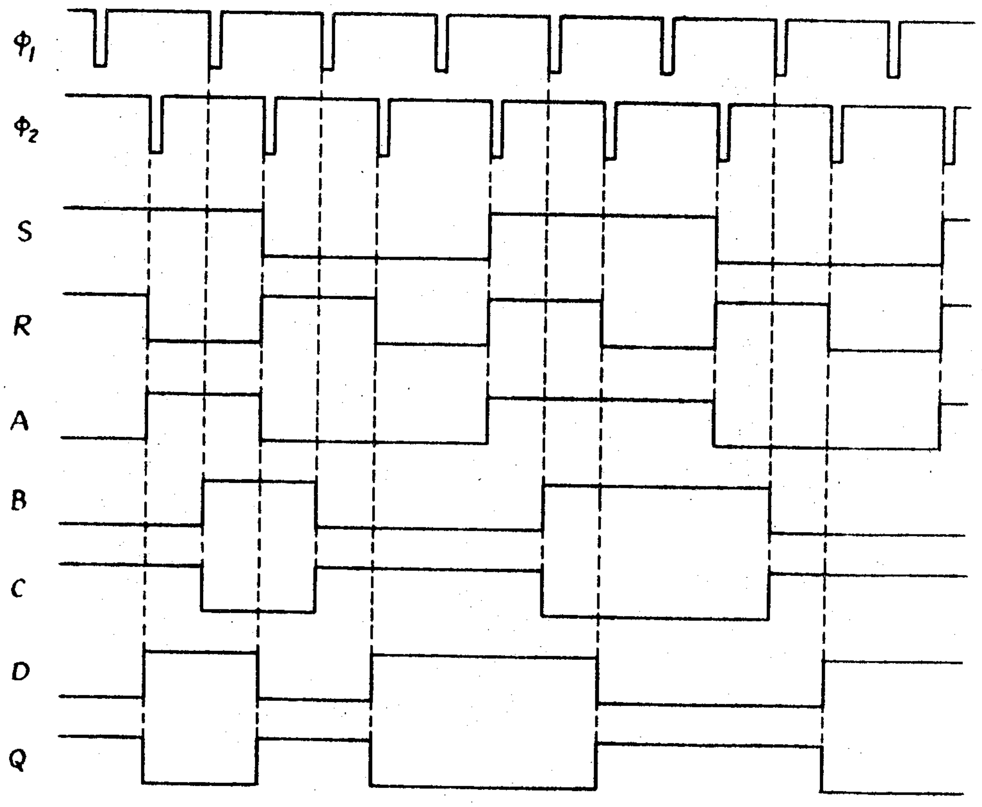
FIG. 9 is a graph showing the operation of the embodiment of the invention of FIG. 8.

The operation of the circuit of FIG. 8 is illustrated graphically in FIG. 9 which illustrates the potential variations in the operation of the circuit, and the circuit will perform in accordance with the following table:

| $R^n$ | $S^n$ | $Q^{n+1}$ |
|---|---|---|
| 0 | 0 | $Q^n$ |
| 0 | 1 | 1 |
| 1 | 0 | 0 |
| 1 | 1 | $Q^{1n}$ |

It will be observed that the operation of the circuit of FIG. 8 is equivalent to that of the so-called JK type flip-flop.

Figure 10:
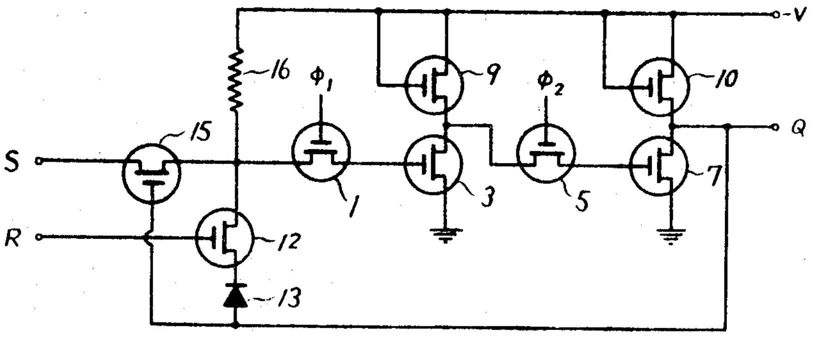
FIG. 10 is a circuit diagram of the embodiment of the invention shown in FIGS. 8 and 9 utilizing field effect transistors.
Figure 11:
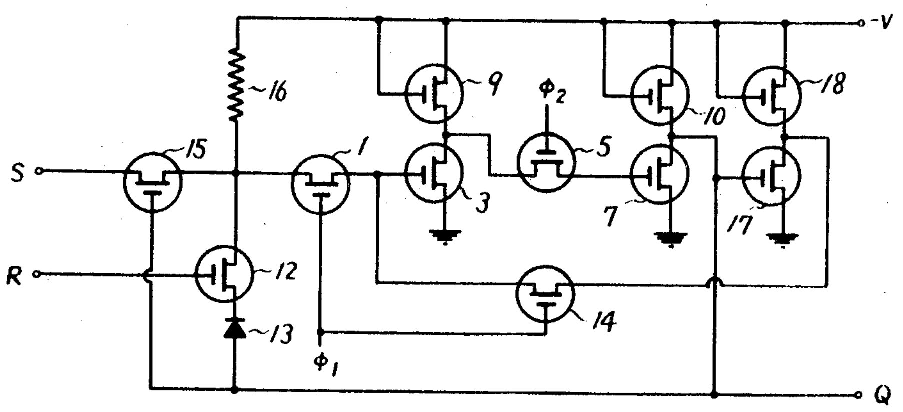
FIGS. 11 and 12 are circuit diagrams illustrating still further modifications of flip-flop circuitry in accordance with the invention.
Figure 12:
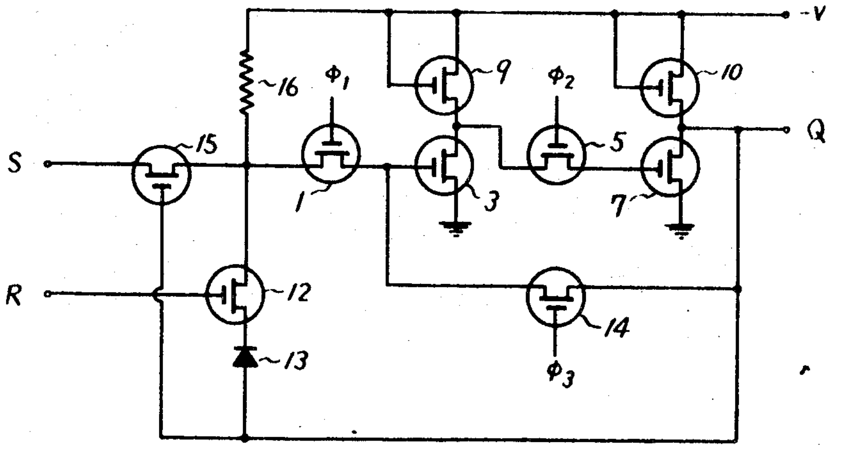

FIG. 10 is a practical application of the circuit of FIG. 8 utilizing MOS field effect transistors as switches 12 and 15 as well as the other switches and inverters illustrated therein. This circuit may be referred to as a two-phase dynamic D-type flip-flop. The circuits shown in FIGS. 11 and 12 embody the additional feedback path including transistor 14 as described in connection with FIG. 7. In FIG. 11, transistors 1 and 14 are operated by clock pulse $\phi_1$ while in FIG. 12 transistor 1 is operated by clock pulse $\phi_1$ while transistor 14 is operated by clock pulse $\phi_3$. The circuit of FIG. 11 is a two-phase static D-type flip-flop while the circuit of FIG. 12 is a three-phase static D-type flip-flop.

We claim:

1. A modified D-type flip-flop circuit comprising at least two MOS field effect transistors connected in cascade to form first and second stages and including a first input terminal connected to said first stage for the application of input signals thereto and an output terminal connected to said second stage, said transistors each having an internal gate capacitance for temporarily storing information and said cascade connection including first switching means controlling the transfer of information from the first stage to the second stage, a feedback circuit including series connected second switching means and two terminal unidirectional means connected between said output terminal and said first input terminal to feed said stored output terminal signal of said second stage directly to the first input terminal of said first stage and a second input terminal connected to said second switching means for feeding signals thereto to selectively complete and interrupt said feedback circuit.

2. A D-type flip-flop circuit according to claim 1 including means for applying synchronized clock signals to said first switching means, and means for synchronizing said input signals with said clock signals.